(12) United States Patent
Danielson et al.

(10) Patent No.: US 9,020,908 B2
(45) Date of Patent: *Apr. 28, 2015

(54) REWRITING RELATIONAL EXPRESSIONS FOR DIFFERENT TYPE SYSTEMS

(71) Applicant: International Business Machines Corporation, Armonk, NY (US)

(72) Inventors: Justin A. Danielson, San Mateo, CA (US); Jeffrey G. Fontaine, San Jose, CA (US); Kevin D. Hite, San Jose, CA (US); Richard V. Tran, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/203,934

(22) Filed: Mar. 11, 2014

(65) Prior Publication Data

US 2014/0201166 A1    Jul. 17, 2014

Related U.S. Application Data

(63) Continuation of application No. 13/740,529, filed on Jan. 14, 2013.

(51) Int. Cl.
*G06F 17/30* (2006.01)
*G06F 9/45* (2006.01)

(52) U.S. Cl.
CPC .......... *G06F 17/30557* (2013.01); *G06F 8/437* (2013.01); *G06F 8/443* (2013.01); *G06F 17/30* (2013.01)

(58) Field of Classification Search
CPC ................................................. G06F 17/30371
USPC ......................................... 707/690, 714, 771
See application file for complete search history.

(56) References Cited

U.S. PATENT DOCUMENTS

| 4,815,021 | A | 3/1989 | Steiner et al. |
| 5,408,660 | A | 4/1995 | Kitadate |
| 6,738,769 | B2 * | 5/2004 | Sharp ................................... 1/1 |
| 6,748,392 | B1 * | 6/2004 | Galindo-Legaria et al. .......... 1/1 |
| 2003/0120682 | A1 * | 6/2003 | Bestgen et al. ............ 707/104.1 |
| 2004/0044662 | A1 * | 3/2004 | Ganesan et al. .................. 707/5 |
| 2004/0060007 | A1 * | 3/2004 | Gottlob et al. ................. 715/513 |
| 2005/0229158 | A1 * | 10/2005 | Thusoo et al. ................ 717/115 |
| 2010/0192129 | A1 * | 7/2010 | Langworthy et al. ......... 717/126 |
| 2010/0312756 | A1 * | 12/2010 | Zhang et al. .................. 707/693 |
| 2011/0055199 | A1 * | 3/2011 | Siddiqui et al. ............... 707/714 |
| 2014/0040312 | A1 * | 2/2014 | Gorman et al. ............... 707/771 |

* cited by examiner

*Primary Examiner* — Noosha Arjomandi
(74) *Attorney, Agent, or Firm* — Alexa L. Ashworth; Jason H. Sosa

(57) ABSTRACT

A computer determines that the type of one or more of a relational operator and operands of a relational expression originated in a first type system, and determines the sign of at least one of the operands. The computer rewrites the relational expression based on the sign of at least one of the operands, sends the rewritten relational expression for evaluation in a second type system, and receives the evaluated rewritten relational expression after evaluation in the second type system. The computer can rewrite the relational expression by generating a group of terms joined disjunctively, as well as by generating a group of conjunctive terms joined disjunctively.

6 Claims, 4 Drawing Sheets

REWRITING RELATIONAL EXPRESSIONS FOR DIFFERENT TYPE SYSTEMS

CROSS REFERENCE TO RELATED APPLICATION

This application is a continuation of U.S. patent application Ser. No. 13/740,529 filed Jan. 14, 2013 the entire content and disclosure of which is incorporated herein by reference.

FIELD OF THE INVENTION

The present invention relates generally to relational expressions, and more particularly to rewriting relational expressions that originate in a first type system for evaluation in a second type system.

BACKGROUND

A relational operator tests or defines the relation between two operands. These relations include numerical equality (e.g., 5=5) and inequalities (e.g., 4≥3), for example. An expression created using a relational operator forms what is known as a relational expression. Generally, in computing systems that include a type system, in a given relational expression, care must be taken that the types of the operands and the type-suitability of the relational operator are matched. If such care is not taken, overt or hidden errors can occur during program execution. In programming languages that include a boolean type in their type system, the evaluation of a relational expression returns true or false, depending on whether or not the conditional relationship between the two operands holds.

A type system associates a type with a value stored in a memory of a computing system, to give a categorical meaning to a sequence, or set, of bits defining the value. In many circumstances the hardware of a computing system is unable to discriminate between the set of bits for a memory address and the set of bits for an instruction code, character, integer, or floating-point number, because the hardware cannot make any intrinsic distinction between any of the possible values of the sets of bits. By associating types with values, and by examining the flow or status of these values before or during program execution, a type system attempts to prove or ensure that certain kinds of errors do not occur. The particular type system in question determines exactly what constitutes a type error, but in general the aim is to prevent a certain kind of value from being used with an operation for which that kind of value does not make sense. Type systems are often specified as parts of programming languages, including query languages for databases, and built into the interpreters and compilers for them.

An interpreter or compiler may use the type of a value to optimize the storage it needs and the choice of operators or algorithms for operations on the value. For example, in many C compilers the float type is represented in 32 bits formatted to include an exponent portion and a mantissa portion, in accord with the IEEE specification for single-precision floating point numbers. These compilers will thus use floating-point-specific microprocessor operations on those values (floating-point addition, multiplication, etc.). For another example, in many database query language interpreters, several integer types are represented with corresponding different bit lengths. These interpreters will thus use particular appropriate optimizations regarding database storage of the several integer type representations.

SUMMARY

Embodiments of the present invention provide for a program product, system, and method in which a computer determines that the type of one or more of a relational operator and operands of a relational expression originated in a first type system, and determines the sign of at least one of the operands. The computer rewrites the relational expression based on the sign of at least one of the operands, sends the rewritten relational expression for evaluation in a second type system, and receives the evaluated rewritten relational expression after evaluation in the second type system. The computer can rewrite the relational expression by generating a group of terms joined disjunctively, as well as by generating a group of conjunctive terms joined disjunctively.

DETAILED DESCRIPTION

Figure 1:
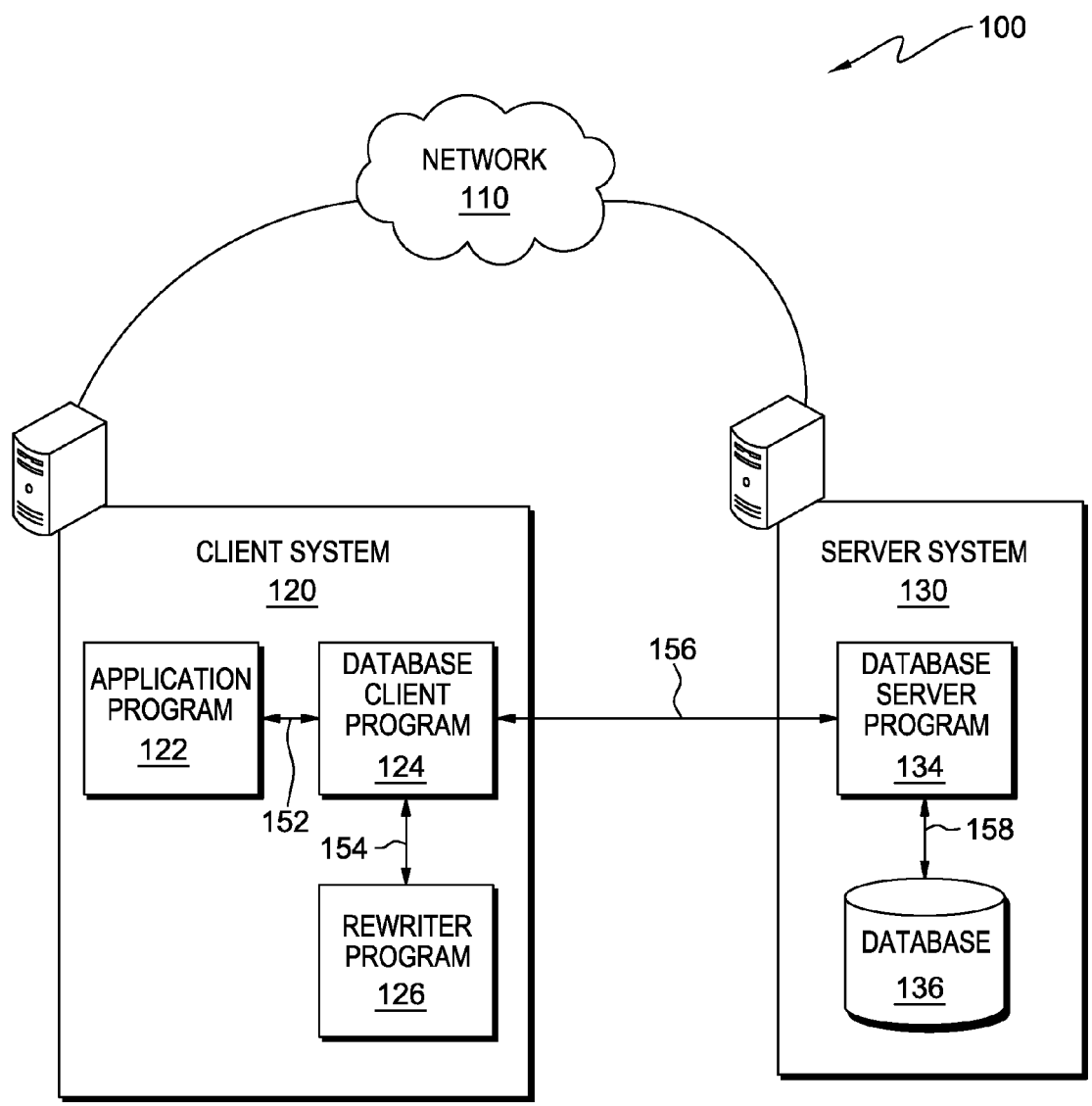
FIG. 1 is a functional block diagram of a computing environment in accordance with an embodiment of the present invention.

Descriptions of various embodiments of the invention are herein presented for purposes of illustration, but are not intended to be exhaustive or limited to the embodiments disclosed. Many modifications and variations will be apparent to those of ordinary skill in the art without departing from the scope and spirit of the described embodiments. Terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor (i.e., a computing processor) of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, a functional block diagram of computing environment 100 in accordance with an embodiment of the present invention is shown. Computing environment 100 includes network 110, client system 120, and server system 130. Network 110 can be, for example, a local area network (LAN), a wide area network (WAN) such as the Internet, or a combination of the two, and can include wired or wireless connections. In general, network 110 can be any combination of connections and protocols that will support communications via various channels between client system 120 and server system 130 in accordance with an embodiment of the invention. As will be discussed in detail below, relational expressions that originate in a first type system utilized in client system 120 can be rewritten for evaluation in a second type system utilized in server system 130.

Client system 120 and server system 130 can be any two computing systems with dissimilar or varying type systems. In the embodiments discussed below, client system 120 and server system 130 interoperate to generate and service requests in the context of database operations. However, it should be understood that the techniques discussed herein can be applied outside the context of database operations. For example, the techniques discussed herein can also be applied in the context of compiler or interpreter operations performed with dissimilar or varying type systems.

In various embodiments, each one of client system 120 and server system 130 can include a laptop, tablet, or netbook personal computer (PC), a desktop computer, a personal digital assistant (PDA), a smart phone, a mainframe computer, or a networked server computer. Further, each one of client system 120 and server system 130 can include computing systems utilizing clustered computers and components to act as single pools of seamless resources when accessed through network 110, or can represent one or more cloud computing datacenters. In general, each one of client system 120 and server system 130 can be any programmable electronic device as described in further detail with respect to FIG. 4.

Client system 120 includes application program 122, database client program 124, and rewriter program 126. Application program 122 can include application software intended for use by an end-user of client system 120, such as a person or a software agent. The application software can include business software, accounting software, personnel management software, or enterprise resource planning software, for example. During use, application program 122 requests data stored in database 136 of server system 130, via database client program 124, in a series of transactions (e.g., transaction 152, etc.) that are discussed in detail below. Database client program 124 assists application software on client system 120 (e.g., application program 122, etc.) make requests to database 136. Database client program 124 can handle requests from multiple programs on client system 120 and can include, in one embodiment, a Java Database Connectivity (i.e., "JDBC") driver. Database client program 124 receives a request for data from application program 122 and transforms the request into a vendor-specific database call for database 136. As such, database client program 124 can be configured to operate with multiple databases supplied by different vendors. One or both of application program 122 and database client program 124 include a first type system that is utilized in client system 120. For a request that originates in the first type system and includes, for example, a particular relational expression, database client program 124 interacts with rewriter program 126 to rewrite the request as discussed in detail below. In one embodiment, rewriter program 126 is included in database client program 124.

Server system 130 includes database server program 134 and database 136. Database server program 134 can include a database management system (i.e., "DBMS") for storing, modifying, and extracting information from database 136, as well as for controlling data access, enforcing data integrity, managing concurrency control, recovering database 136 after a failure, restoring database 136 from a backup, and maintaining database security. Database 136 can be a structured collection of data, organized to model relevant aspects of reality in a way that supports programs (e.g., application program 122, etc.) that require this information. One or both of database server program 134 and database 136 include a second type system that is utilized in server system 130. Requests originating in the first type system of client system 120 are rewritten to accommodate the second type system utilized in server system 130, prior to arrival at server system 130 in one embodiment, as discussed in detail below.

As stated above, requests that originate in a first type system utilized in client system 120 can be rewritten for evaluation in a second type system utilized in server system 130. The first type system and the second type system can each associate a type with a value stored in a memory of client system 120 and server system 130, respectively, to give a categorical meaning to the sequence of bits defining the value. Types can include, for example, byte-length integers, short integers, word-length integers (e.g., 32-bit integers, etc.), and long integers. Types can further include integers of varying lengths represented according to a two's complement representation, a one's complement representation, a signed representation, or an unsigned representation. Further still, types can include floating point numbers of varying lengths and formats, as well as packed decimals and zoned decimals. Notably, where the first type system and the second type system do not share all types, requests that originate in the first type system and that are expressed in a type that does not exist in the second type system may not evaluate appropriately under the second type system. For example, if the first type system includes packed decimals, and the second type system does not include packed decimals, then a request including a relational expression comparing two packed decimals, originating in the first type system, will probably not evaluate correctly in the second type system. Such requests are rewritten to accommodate the second type system in accordance with an embodiment of the present invention.

In one embodiment, since a request originates in application program 122 of client system 120, the request corresponds to a first type system that is used by application program 122. Consequently, the request is rewritten to accommodate the second type system utilized in server system 130 during transactions 152, 154, 156, and 158. That is, during transaction 152, application program 122 generates a request for data and sends the request for data to database client program 124. The request is formulated in terms of the first type system utilized in client system 120. In one embodiment, transaction 152 is a bidirectional transaction, left open until results arrive back from database 136 after several intermediate transactions 154, 156, and 158. Database client program 124 can examine the request to determine if it should be rewritten to accommodate the second type system utilized in server system 130 by, for example, comparing a relational expression (e.g., a relational operator and two operands, etc.) in the request with a compatibility table listing the types in the first type system and the second type system. If database client program 124 determines that rewriting is necessary to ensure accurate evaluation of the request on server system 130, then the request is sent to rewriter program 126, rewritten, and returned to database client program 124 in transaction 154. In transaction 156, database client program 124 transmits the request to database server program 134. Database server program 134 evaluates the request utilizing database 136 in transaction 158. The results of evaluating the request are returned to application program 122 as transactions 158, 156, and 152 are completed and closed.

Rewriter program 126 rewrites requests originating on client system 120 to ensure their accurate evaluation on server system 130. For example, rewriter program 126 can rewrite a variety of requests that include relational operators to ensure their accurate evaluation in a second type system that includes only unsigned binary relational operators. Unsigned binary relational operators include, for example, relational operators, such as "<" (i.e., "less than"), "≤" (i.e., "less than or equal to"), ">" (i.e., "greater than"), and "≥" (i.e., "greater than or equal to"), which operate on sequences of bits that do not include sign information. A sequence of bits includes sign information when it includes one or more bits indicating whether the meaning of the number represented by the sequence of bits is positive (i.e., greater than zero) or negative (i.e., less than zero). Generally, if a sequence of bits does not include sign information, then the meaning of the number represented by the sequence of bits can only be positive.

In one embodiment, rewriter program 126 rewrites a request that includes a signed two's complement byte-length relational operator to ensure its accurate evaluation in a second type system that includes only unsigned binary relational operators.

If the request includes a "greater than" comparison in the form "X>Y", then if Y≥0 in the first type system, the request can be rewritten as "(X>Y) AND (X≤0x7F)" where 0x7F (i.e., 127 written in hexadecimal) is the maximum positive value for a two's complement byte field. This ensures that all negative values of X (i.e., anything greater than 0x7F) are excluded. If Y<0 in the first type system, the request can be rewritten as "(X>Y) OR (X≤0x7F). This ensures that all positive values of X are included.

If the request includes a "greater than or equal to" comparison in the form "X≥Y," then if Y>0 in the first type system, the request can be rewritten as "(X≥Y) AND (X≤0x7F)." This ensures that all negative values of X (i.e., anything greater than 0x7F) are excluded. If Y<0 in the first type system, the request can be rewritten as "(X≥Y) OR (X≤0x7F). This ensures that all positive values of X are included. If Y=0 in the first type system, then, the request can be rewritten as "X≤0x7F." This includes all non-negative values.

If the request includes a "less than" comparison in the form "X<Y," then if Y≥0 in the first type system, the request can be rewritten as "(X<Y) OR (X>0x7F). This ensures that all negative values of X are included. If Y<0 in the first type system, then the request can be rewritten as "(X<Y) AND (X>0x7F)." This ensures that all positive values of X are excluded.

If the request includes a "less than or equal to" comparison in the form "X≤Y," then if Y>0 in the first type system, the request can be rewritten as "(X≤Y) OR (X>0x7F)." This ensures that all negative values of X are included. If Y<0 in the first type system, then the request can be rewritten as "(X≤Y) AND (X>0x7F)." This ensures that all positive values of X are excluded. If Y=0 in the first type system, then the request can be rewritten as "(X=0) OR (X>0x7F)." This includes all non-positive values.

Thus, as discussed above, rewriter program 126 can rewrite a request that includes a signed two's complement byte length relational operator to ensure its accurate evaluation in a second type system that includes only unsigned binary relational operators. Notably, a similar technique can be used for non-byte-length two's complement numbers. For example, for word-length (e.g., four bytes) two's complement numbers, if the request includes a "greater than" comparison in the form "X>Y," then if Y≥0 in the first type system, the request can be rewritten as "(X>Y) AND (X≤0x7FFFFFFF)" where 0x7FFFFFFF is the maximum positive value for a two's complement word (e.g., four bytes) field. This ensures that all negative values of X (i.e., anything greater than 0x7FFFFFFF) are excluded. This similar technique can be extended to each of the signed two's complement relational operators (e.g., ">", "<", "≥", and "≤") discussed above.

In one embodiment, rewriter program 126 rewrites a request that includes a floating-point type relational operator to ensure its accurate evaluation in a second type system that includes only unsigned binary relational operators. For floating-point types, such as "double" and "float," the internal data representation in the first type system will differ depending on what data representation model is being used (e.g., IEEE or IBM, etc.). IEEE and IBM floating point representations share a similarity in that the sign bit is the most significant bit, followed by a biased exponent, followed by a mantissa.

If the request includes a "less than or equal to" comparison in the form "X≤Y," then if Y>0 in the first type system, the request can be rewritten as "(X≤Y) OR (X>0x7F)." This ensures that all negative values of X are included. If Y<0 in the first type system, then the request can be rewritten as "(X≤Y) AND (X>0x7F)." This ensures that all positive values of X are excluded. If Y=0 in the first type system, then the request can be rewritten as "(X=0) OR (X>0x7F)." This includes all non-positive values.

If the request includes a "greater than" comparison in the form "X>Y," then if Y≥0 in the first type system, the request can be rewritten as "(X>Y) AND (X≤0x7FFFFFFF), where 0x7FFFFFFF is the maximum positive value for a "float" field. This ensures that all negative values of X (i.e., anything greater than 0x7FFFFFFF) are excluded. If Y<0 in the first type system, the request can be rewritten as "X<Y." This ensures that all positive values of X are included.

If the request includes a "greater than or equal to" comparison in the form "X≥Y" then if Y≥0 in the first type system, the request can be rewritten as "(X≥Y) AND (X≤0x7FFFFFFF). This ensures that all negative values of X (i.e., anything greater than 0x7FFFFFFF) are excluded. If Y<0 in the first type system, the request can be rewritten as "X≤Y." This ensures that all positive values of X are included.

If the request includes a "less than" comparison in the form "X<Y" then if Y≥0 in the first type system, the request can be rewritten as "(X<Y) OR (X>0x7FFFFFFF)." This ensures that all negative values of X are included. If Y<0 in the first type system, the request can be rewritten as "X>Y."

If the request includes a "less than or equal to" comparison in the form "X≤Y" then if Y>0 in the first type system, the request can be rewritten as "(X≤Y) OR (X>0x7FFFFFFF)." This ensures that all negative values of X are included. If Y<0 in the first type system, the request can be rewritten as "X≥Y." If Y=0 in the first type system, the request can be rewritten as "(X=0) OR (X>0x77FFFFFF)." This includes all non-positive values.

Thus, as discussed above, rewriter program 126 can rewrite a request that includes a floating-point type relational operator to ensure its accurate evaluation in a second type system that includes only unsigned binary relational operators. The technique discussed above can be used for various length floating-point type numbers, by varying the length of the constant 0x7FFFFFFF, in a manner similar to that discussed for non-byte-length two's complement numbers above. This variation can be extended to each of the floating-point type relational operators (e.g., ">", "<", "≥", and "≤") discussed above.

In one embodiment, rewriter program 126 rewrites a request that includes a packed decimal format relational operator to ensure its accurate evaluation in a second type system that includes only unsigned binary relational operators. The packed decimal number format is, for example, used on IBM Mainframe Systems and supported by COBOL. A packed decimal number includes multiple bytes, with each byte containing two four-bit nibbles. Each nibble represents a digit of the number being stored, with the exception of the final nibble, which stores sign information. Thus, to represent positive and negative numbers, a unique value is stored in the final "sign" nibble; for example the sign nibble is hexadecimal "C" for positive numbers, hexadecimal "D" for negative numbers, and hexadecimal "F" for implied positive or unsigned numbers. Packed decimal numbers typically have a fixed length. When nibbles in these numbers are unused, they can be filled with zeros.

To rewrite a request that includes a packed decimal format relational operator, rewriter program 126 segments the packed decimal number operands into bytes. The first segment of each operand includes the leading bytes which have no sign information. The second segment of each operand is the last byte, which contains sign information in the last nibble. For example, if the request includes a relational expression "X<−124," and the "<" relational operator is a packed decimal format relational operator (e.g., because the types of X and −124 are packed decimal, for example), then the resulting first and second segments of the second operand are 12 and −4 (i.e., are 0x12 and 0x4D). The resulting first and second segments of the first operand can be filled in subsequently, during evaluation on server system 130. After segmenting the packed decimal number operands, rewriter program 126 generates a new relational expression including a group of conjunctive terms joined disjunctively, as discussed below.

If the request that includes a packed decimal format relational operator includes a "greater than" comparison in the form "X>Y," then if Y≥0 in the first type system, the request can be rewritten by rewriter program 126 in several steps. First, the operand Y is segmented. For example, if Y is 124, Y is split into the segments 12 and 4. Second, the operand X is provisionally segmented into an "XlastDigit" segment and an "XleadingDigits" segment. Third, rewriter program 126 generates ten conjunctive terms, as follows:

"XlastDigit=0x0C AND XleadingDigits>0x12"
"XlastDigit=0x1C AND XleadingDigits>0x12"
"XlastDigit=0x2C AND XleadingDigits>0x12"
"XlastDigit=0x3C AND XleadingDigits>0x12"
"XlastDigit=0x4C AND XleadingDigits>0x12"
"XlastDigit=0x5C AND XleadingDigits>0x12"
"XlastDigit=0x6C AND XleadingDigits>0x12"
"XlastDigit=0x7C AND XleadingDigits>0x12"
"XlastDigit=0x8C AND XleadingDigits>0x12"
"XlastDigit=0x9C AND XleadingDigits>0x12"

These ten conjunctive terms each test for equality of the last digit segment of X and one of a series of ascending constants (e.g., 0x0C, 0x1C, etc.), and also compare the leading digits segment of X to a fixed constant (i.e., 0x12). The ascending constants occupy the range of possible values of the last digit segment of Y, while the fixed constant is equal to the leading digits segment of Y.

Having generated the ten conjunctive terms, rewriter program 126 then modifies the comparison operator of the conjunctive terms generated in excess of one more than the number stored in the first nibble of the last digit segment of Y (if there are no such excess generated conjunctive terms, the modification step is omitted). In the current example, in which the last digit segment of Y is equal to positive 4 (i.e., 0x4C), the number stored in the first nibble of the last digit segment of Y is 4. Thus, in the current example, rewriter program 126 modifies the comparison operator of the conjunctive terms generated in excess of one more than 4, as follows:

"XlastDigit=0x0C AND XleadingDigits>0x12"
"XlastDigit=0x1C AND XleadingDigits>0x12"
"XlastDigit=0x2C AND XleadingDigits>0x12"
"XlastDigit=0x3C AND XleadingDigits>0x12"
"XlastDigit=0x4C AND XleadingDigits>0x12"
"XlastDigit=0x5C AND XleadingDigits≥0x12"
"XlastDigit=0x6C AND XleadingDigits≥0x12"
"XlastDigit=0x7C AND XleadingDigits≥0x12"
"XlastDigit=0x8C AND XleadingDigits≥0x12"
"XlastDigit=0x9C AND XleadingDigits≥0x12"

Having generated and modified the ten conjunctive terms, rewriter program 126 then joins the ten conjunctive terms disjunctively, as follows:

"XlastDigit=0x0C AND XleadingDigits>0x12 OR"
"XlastDigit=0x1C AND XleadingDigits>0x12 OR"
"XlastDigit=0x2C AND XleadingDigits>0x12 OR"
"XlastDigit=0x3C AND XleadingDigits>0x12 OR"
"XlastDigit=0x4C AND XleadingDigits>0x12 OR"
"XlastDigit=0x5C AND XleadingDigits≥0x12 OR"
"XlastDigit=0x6C AND XleadingDigits≥0x12 OR"
"XlastDigit=0x7C AND XleadingDigits≥0x12 OR"
"XlastDigit=0x8C AND XleadingDigits≥0x12 OR"
"XlastDigit=0x9C AND XleadingDigits≥0x12"

Having generated, modified and joined the ten conjunctive terms, rewriter program 126 has finished generating a new relational expression including a group of conjunctive terms joined disjunctively for a request including a "greater than" comparison in the form "X>Y" with a packed decimal format relational operator, where Y≥0 in the first type system.

In contrast, if Y<0 in the first type system, the request that includes a packed decimal format relational operator can be rewritten by rewriter program 126 in several different steps. First, the operand Y is segmented. For example, if Y is −124, Y is split into the segments 12 and −4. Second, the operand X is provisionally segmented into an "XlastDigit" segment and an "XleadingDigits" segment. Third, rewriter program 126 generates twenty conjunctive terms, as follows:

"XlastDigit=0x0D AND XleadingDigits<0x12"
"XlastDigit=0x1D AND XleadingDigits<0x12"
"XlastDigit=0x2D AND XleadingDigits<0x12"
"XlastDigit=0x3D AND XleadingDigits<0x12"
"XlastDigit=0x4D AND XleadingDigits<0x12"
"XlastDigit=0x5D AND XleadingDigits<0x12"
"XlastDigit=0x6D AND XleadingDigits<0x12"
"XlastDigit=0x7D AND XleadingDigits<0x12"
"XlastDigit=0x8D AND XleadingDigits<0x12"
"XlastDigit=0x9D AND XleadingDigits<0x12"
"XlastDigit=0x0C"
"XlastDigit=0x1C"
"XlastDigit=0x2C"
"XlastDigit=0x3C"
"XlastDigit=0x4C"
"XlastDigit=0x5C"
"XlastDigit=0x6C"
"XlastDigit=0x7C"
"XlastDigit=0x8C"
"XlastDigit=0x9C"

The first ten of these conjunctive terms each test for equality of the last digit segment of X and one of a series of descending constants (e.g., 0x0D, 0x1D, etc.), and also compare the leading digits segment of X to a fixed constant (i.e., 0x12). The descending constants occupy the range of possible values of the last digit segment of Y, while the fixed constant is equal to the leading digits segment of Y. The second ten of these conjunctive terms each test for equality of the last digit segment of X and one of a series of ascending constants (e.g., 0x0C, 0x1C, etc.).

Having generated the twenty conjunctive terms, rewriter program 126 then modifies the comparison operator of the conjunctive terms generated up to the amount of the number stored in the first nibble of the last digit segment of Y (if that number is 0, the modification step is omitted). In the current example, in which the last digit segment of Y is equal to negative 4 (i.e., 0x4D), the number stored in the first nibble of the last digit segment of Y is 4. Thus, in the current example, rewriter program 126 modifies the comparison operator of the conjunctive terms generated up to the amount of the number 4, as follows:

"XlastDigit=0x0D AND XleadingDigits≤0x12"
"XlastDigit=0x1D AND XleadingDigits≤0x12"
"XlastDigit=0x2D AND XleadingDigits≤0x12"
"XlastDigit=0x3D AND XleadingDigits≤0x12"
"XlastDigit=0x4D AND XleadingDigits<0x12"
"XlastDigit=0x5D AND XleadingDigits<0x12"
"XlastDigit=0x6D AND XleadingDigits<0x12"
"XlastDigit=0x7D AND XleadingDigits<0x12"
"XlastDigit=0x8D AND XleadingDigits<0x12"
"XlastDigit=0x9D AND XleadingDigits<0x12"
"XlastDigit=0x0C"
"XlastDigit=0x1C"
"XlastDigit=0x2C"
"XlastDigit=0x3C"
"XlastDigit=0x4C"
"XlastDigit=0x5C"
"XlastDigit=0x6C"
"XlastDigit=0x7C"
"XlastDigit=0x8C"
"XlastDigit=0x9C"

Having generated and modified the twenty conjunctive terms, rewriter program 126 then joins the twenty conjunctive terms disjunctively, as follows:

"XlastDigit=0x0D AND XleadingDigits≤0x12 OR"
"XlastDigit=0x1D AND XleadingDigits≤0x12 OR"
"XlastDigit=0x2D AND XleadingDigits≤0x12 OR"
"XlastDigit=0x3D AND XleadingDigits≤0x12 OR"
"XlastDigit=0x4D AND XleadingDigits<0x12 OR"
"XlastDigit=0x5D AND XleadingDigits<0x12 OR"
"XlastDigit=0x6D AND XleadingDigits<0x12 OR"
"XlastDigit=0x7D AND XleadingDigits<0x12 OR"
"XlastDigit=0x8D AND XleadingDigits<0x12 OR"
"XlastDigit=0x9D AND XleadingDigits<0x12 OR"
"XlastDigit=0x0C OR"
"XlastDigit=0x1C OR"
"XlastDigit=0x2C OR"
"XlastDigit=0x3C OR"
"XlastDigit=0x4C OR"
"XlastDigit=0x5C OR"

"XlastDigit=0x6C OR"
"XlastDigit=0x7C OR"
"XlastDigit=0x8C OR"
"XlastDigit=0x9C"

Having generated, modified and joined the twenty conjunctive terms, rewriter program 126 has finished generating a new relational expression including a group of conjunctive terms joined disjunctively for a request including a "greater than" comparison in the form "X>Y" with a packed decimal format relational operator, where Y<0 in the first type system.

As discussed above, requests that include packed decimal format relational operators in the form "X>Y," in situations in which Y≥0 and Y<0 in the first type system, can be rewritten by rewriter program 126 in several varying steps. As will be discussed below, rewriter program 126 can also rewrite requests that include packed decimal format relational operators in the forms "X≥Y," "X<Y" and "X≤Y." Discussion of the operation of rewriter program 126 will be abbreviated by reliance on the techniques introduced above in the context of rewriting requests of the form "X>Y."

If the request that includes a packed decimal format relational operator includes a "greater than or equal to" comparison in the form "X≥Y," then if Y≥0 in the first type system, the request can be rewritten by rewriter program 126 in several steps. First, the operand Y is segmented. For example, if Y is 124, Y is split into the segments 12 and 4. Second, the operand X is provisionally segmented into an "XlastDigit" segment and an "XleadingDigits" segment. Third, rewriter program 126 generates ten conjunctive terms which each test for equality of the last digit segment of X and one of a series of constants, and also compare the leading digits segment of X to a fixed constant.

Having generated the ten conjunctive terms, rewriter program 126 then modifies the comparison operator of the conjunctive terms generated in excess of the number stored in the first nibble of the last digit segment of Y (if there are no such excess generated conjunctive terms, the modification step is omitted). In the current example, in which the last digit segment of Y is equal to positive 4 (i.e., 0x4C), the number stored in the first nibble of the last digit segment of Y is 4. Thus, in the current example, rewriter program 126 modifies the comparison operator of the conjunctive terms generated in excess of 4. Having generated and modified the ten conjunctive terms, rewriter program 126 then joins the ten conjunctive terms disjunctively, as follows:

"XlastDigit=0x0C AND XleadingDigits>0x12 OR"
"XlastDigit=0x1C AND XleadingDigits>0x12 OR"
"XlastDigit=0x2C AND XleadingDigits>0x12 OR"
"XlastDigit=0x3C AND XleadingDigits>0x12 OR"
"XlastDigit=0x4C AND XleadingDigits≥0x12 OR"
"XlastDigit=0x5C AND XleadingDigits≥0x12 OR"
"XlastDigit=0x6C AND XleadingDigits≥0x12 OR"
"XlastDigit=0x7C AND XleadingDigits≥0x12 OR"
"XlastDigit=0x8C AND XleadingDigits≥0x12 OR"
"XlastDigit=0x9C AND XleadingDigits≥0x12"

Having generated, modified and joined the ten conjunctive terms, rewriter program 126 has finished generating a new relational expression including a group of conjunctive terms joined disjunctively for a request including a "greater than or equal to" comparison in the form "X≥Y" with a packed decimal format relational operator, where Y≥0 in the first type system.

In contrast, if Y<0 in the first type system, the request that includes a packed decimal format relational operator can be rewritten by rewriter program 126 in several different steps. First, the operand Y is segmented. For example, if Y is −124, Y is split into the segments 12 and −4. Second, the operand X is provisionally segmented into an "XlastDigit" segment and an "XleadingDigits" segment. Third, rewriter program 126 generates twenty conjunctive terms, the first ten of which each test for equality of the last digit segment of X and one of a series of constants, and also compare the leading digits segment of X to a fixed constant. The constants occupy the range of possible values of the last digit segment of Y, while the fixed constant is equal to the leading digits segment of Y. The second ten of these conjunctive terms each test for equality of the last digit segment of X and one of a series of constants.

Having generated the twenty conjunctive terms, rewriter program 126 then modifies the comparison operator of the conjunctive terms generated up to one more than the amount of the number stored in the first nibble of the last digit segment of Y. In the current example, in which the last digit segment of Y is equal to negative 4 (i.e., 0x4D), the number stored in the first nibble of the last digit segment of Y is 4. Thus, in the current example, rewriter program 126 modifies the comparison operator of the conjunctive terms generated up to one more than the amount of the number 4. Having generated and modified the twenty conjunctive terms, rewriter program 126 then joins the twenty conjunctive terms disjunctively, as follows:

"XlastDigit=0x0D AND XleadingDigits≤0x12 OR"
"XlastDigit=0x1D AND XleadingDigits≤0x12 OR"
"XlastDigit=0x2D AND XleadingDigits≤0x12 OR"
"XlastDigit=0x3D AND XleadingDigits≤0x12 OR"
"XlastDigit=0x4D AND XleadingDigits≤0x12 OR"
"XlastDigit=0x5D AND XleadingDigits<0x12 OR"
"XlastDigit=0x6D AND XleadingDigits<0x12 OR"
"XlastDigit=0x7D AND XleadingDigits<0x12 OR"
"XlastDigit=0x8D AND XleadingDigits<0x12 OR"
"XlastDigit=0x9D AND XleadingDigits<0x12 OR"
"XlastDigit=0x0C OR"
"XlastDigit=0x1C OR"
"XlastDigit=0x2C OR"
"XlastDigit=0x3C OR"
"XlastDigit=0x4C OR"
"XlastDigit=0x5C OR"
"XlastDigit=0x6C OR"
"XlastDigit=0x7C OR"
"XlastDigit=0x8C OR"
"XlastDigit=0x9C"

Having generated, modified and joined the twenty conjunctive terms, rewriter program 126 has finished generating a new relational expression including a group of conjunctive terms joined disjunctively for a request including a "greater than or equal to" comparison in the form "X≥Y" with a packed decimal format relational operator, where Y<0 in the first type system.

If the request that includes a packed decimal format relational operator includes a "less than" comparison in the form "X<Y," then if Y≥0 in the first type system, the request can be rewritten by rewriter program 126 in several steps. First, the operand Y is segmented. For example, if Y is 124, Y is split into the segments 12 and 4. Second, the operand X is provisionally segmented into an "XlastDigit" segment and an "XleadingDigits" segment. Third, rewriter program 126 generates twenty conjunctive terms, the first ten of which each test for equality of the last digit segment of X and one of a series of constants, and also compare the leading digits segment of X to a fixed constant. The constants occupy the range of possible values of the last digit segment of Y, while the fixed constant is equal to the leading digits segment of Y. The second ten of these conjunctive terms each test for equality of the last digit segment of X and one of a series of constants.

Having generated the twenty conjunctive terms, rewriter program 126 then modifies the comparison operator of the conjunctive terms generated up to the amount of the number stored in the first nibble of the last digit segment of Y (if that number is 0, the modification step is omitted). In the current example, in which the last digit segment of Y is equal to 4 (i.e., 0x4C), the number stored in the first nibble of the last digit segment of Y is 4. Thus, in the current example, rewriter program 126 modifies the comparison operator of the conjunctive terms generated up to the amount of the number 4. Having generated and modified the twenty conjunctive terms, rewriter program 126 then joins the twenty conjunctive terms disjunctively, as follows:

"XlastDigit=0x0C AND XleadingDigits≤0x12 OR"
"XlastDigit=0x1C AND XleadingDigits≤0x12 OR"
"XlastDigit=0x2C AND XleadingDigits≤0x12 OR"
"XlastDigit=0x3C AND XleadingDigits≤0x12 OR"
"XlastDigit=0x4C AND XleadingDigits<0x12 OR"
"XlastDigit=0x5C AND XleadingDigits<0x12 OR"
"XlastDigit=0x6C AND XleadingDigits<0x12 OR"
"XlastDigit=0x7C AND XleadingDigits<0x12 OR"
"XlastDigit=0x8C AND XleadingDigits<0x12 OR"
"XlastDigit=0x9C AND XleadingDigits<0x12 OR"
"XlastDigit=0x0D OR"
"XlastDigit=0x1D OR"
"XlastDigit=0x2D OR"
"XlastDigit=0x3D OR"
"XlastDigit=0x4D OR"
"XlastDigit=0x5D OR"
"XlastDigit=0x6D OR"
"XlastDigit=0x7D OR"
"XlastDigit=0x8D OR"
"XlastDigit=0x9D"

In contrast, if Y<0 in the first type system, the request that includes a packed decimal format relational operator can be rewritten by rewriter program 126 in several different steps. First, the operand Y is segmented. For example, if Y is −124, Y is split into the segments 12 and −4. Second, the operand X is provisionally segmented into an "XlastDigit" segment and an "XleadingDigits" segment. Third, rewriter program 126 generates twenty conjunctive terms, the first ten of which each test for equality of the last digit segment of X and one of a series of constants, and also compare the leading digits segment of X to a fixed constant. The constants occupy the range of possible values of the last digit segment of Y, while the fixed constant is equal to the leading digits segment of Y. The second ten of these conjunctive terms each test for equality of the last digit segment of X and one of a series of constants.

Having generated the twenty conjunctive terms, rewriter program 126 then modifies the comparison operator of the conjunctive terms generated in excess of one more than the number stored in the first nibble of the last digit segment of Y (if there are no such excess generated conjunctive terms, the modification step is omitted). In the current example, in which the last digit segment of Y is equal to negative 4 (i.e., 0x4D), the number stored in the first nibble of the last digit segment of Y is 4. Thus, in the current example, rewriter program 126 modifies the comparison operator of the conjunctive terms generated in excess of one more than 4. Having generated and modified the twenty conjunctive terms, rewriter program 126 then joins the twenty conjunctive terms disjunctively, as follows:

"XlastDigit=0x0C AND XleadingDigits>0x12 OR"
"XlastDigit=0x1C AND XleadingDigits>0x12 OR"
"XlastDigit=0x2C AND XleadingDigits>0x12 OR"
"XlastDigit=0x3C AND XleadingDigits>0x12 OR"
"XlastDigit=0x4C AND XleadingDigits>0x12 OR"
"XlastDigit=0x5C AND XleadingDigits≥0x12 OR"
"XlastDigit=0x6C AND XleadingDigits≥0x12 OR"
"XlastDigit=0x7C AND XleadingDigits≥0x12 OR"
"XlastDigit=0x8C AND XleadingDigits≥0x12 OR"
"XlastDigit=0x9C AND XleadingDigits≥0x12 OR"
"XlastDigit=0x0D OR"
"XlastDigit=0x1D OR"
"XlastDigit=0x2D OR"
"XlastDigit=0x3D OR"
"XlastDigit=0x4D OR"
"XlastDigit=0x5D OR"
"XlastDigit=0x6D OR"
"XlastDigit=0x7D OR"
"XlastDigit=0x8D OR"
"XlastDigit=0x9D"

Having generated, modified and joined the twenty conjunctive terms, rewriter program 126 has finished generating a new relational expression including a group of conjunctive terms joined disjunctively for a request including a "less than" comparison in the form "X<Y" with a packed decimal format relational operator, where Y<0 in the first type system.

If the request that includes a packed decimal format relational operator includes a "less than or equal to" comparison in the form "X≤Y," then if Y≥0 in the first type system, the request can be rewritten by rewriter program 126 in several steps. First, the operand Y is segmented. For example, if Y is 124, Y is split into the segments 12 and 4. Second, the operand X is provisionally segmented into an "XlastDigit" segment and an "XleadingDigits" segment. Third, rewriter program 126 generates twenty conjunctive terms, the first ten of which each test for equality of the last digit segment of X and one of a series of constants, and also compare the leading digits segment of X to a fixed constant. The constants occupy the range of possible values of the last digit segment of Y, while the fixed constant is equal to the leading digits segment of Y. The second ten of these conjunctive terms each test for equality of the last digit segment of X and one of a series of constants.

Having generated the twenty conjunctive terms, rewriter program 126 then modifies the comparison operator of the conjunctive terms generated up to one more than the amount of the number stored in the first nibble of the last digit segment of Y. In the current example, in which the last digit segment of Y is equal to 4 (i.e., 0x4C), the number stored in the first nibble of the last digit segment of Y is 4. Thus, in the current example, rewriter program 126 modifies the comparison operator of the conjunctive terms generated up to one more than the amount of the number 4. Having generated and modified the twenty conjunctive terms, rewriter program 126 then joins the twenty conjunctive terms disjunctively, as follows:

"XlastDigit=0x0C AND XleadingDigits≤0x12 OR"
"XlastDigit=0x1C AND XleadingDigits≤0x12 OR"
"XlastDigit=0x2C AND XleadingDigits≤0x12 OR"
"XlastDigit=0x3C AND XleadingDigits≤0x12 OR"
"XlastDigit=0x4C AND XleadingDigits≤0x12 OR"
"XlastDigit=0x5C AND XleadingDigits<0x12 OR"
"XlastDigit=0x6C AND XleadingDigits<0x12 OR"
"XlastDigit=0x7C AND XleadingDigits<0x12 OR"
"XlastDigit=0x8C AND XleadingDigits<0x12 OR"
"XlastDigit=0x9C AND XleadingDigits<0x12 OR"
"XlastDigit=0x0D OR"
"XlastDigit=0x1D OR"
"XlastDigit=0x2D OR"
"XlastDigit=0x3D OR"
"XlastDigit=0x4D OR"

"XlastDigit=0x5D OR"
"XlastDigit=0x6D OR"
"XlastDigit=0x7D OR"
"XlastDigit=0x8D OR"
"XlastDigit=0x9D"

In contrast, if Y<0 in the first type system, the request that includes a packed decimal format relational operator can be rewritten by rewriter program 126 in several different steps. First, the operand Y is segmented. For example, if Y is −124, Y is split into the segments 12 and −4. Second, the operand X is provisionally segmented into an "XlastDigit" segment and an "XleadingDigits" segment. Third, rewriter program 126 generates twenty conjunctive terms, the first ten of which each test for equality of the last digit segment of X and one of a series of constants, and also compare the leading digits segment of X to a fixed constant. The constants occupy the range of possible values of the last digit segment of Y, while the fixed constant is equal to the leading digits segment of Y. The second ten of these conjunctive terms each test for equality of the last digit segment of X and one of a series of constants.

Having generated the twenty conjunctive terms, rewriter program 126 then modifies the comparison operator of the conjunctive terms generated in excess of the number stored in the first nibble of the last digit segment of Y. In the current example, in which the last digit segment of Y is equal to negative 4 (i.e., 0x4D), the number stored in the first nibble of the last digit segment of Y is 4. Thus, in the current example, rewriter program 126 modifies the comparison operator of the conjunctive terms generated in excess of 4. Having generated and modified the twenty conjunctive terms, rewriter program 126 then joins the twenty conjunctive terms disjunctively, as follows:

"XlastDigit=0x0C AND XleadingDigits>0x12 OR"
"XlastDigit=0x1C AND XleadingDigits>0x12 OR"
"XlastDigit=0x2C AND XleadingDigits>0x12 OR"
"XlastDigit=0x3C AND XleadingDigits>0x12 OR"
"XlastDigit=0x4C AND XleadingDigits≥0x12 OR"
"XlastDigit=0x5C AND XleadingDigits≥0x12 OR"
"XlastDigit=0x6C AND XleadingDigits≥0x12 OR"
"XlastDigit=0x7C AND XleadingDigits≥0x12 OR"
"XlastDigit=0x8C AND XleadingDigits≥0x12 OR"
"XlastDigit=0x9C AND XleadingDigits≥0x12 OR"
"XlastDigit=0x0D OR"
"XlastDigit=0x1D OR"
"XlastDigit=0x2D OR"
"XlastDigit=0x3D OR"
"XlastDigit=0x4D OR"
"XlastDigit=0x5D OR"
"XlastDigit=0x6D OR"
"XlastDigit=0x7D OR"
"XlastDigit=0x8D OR"
"XlastDigit=0x9D"

Having generated, modified and joined the twenty conjunctive terms, rewriter program 126 has finished generating a new relational expression including a group of conjunctive terms joined disjunctively for a request including a "less than or equal to" comparison in the form "X≤Y" with a packed decimal format relational operator, where Y<0 in the first type system.

As discussed above, requests that include packed decimal format relational operators in the form "X>Y," "X≥Y," "X<Y" and "X≤Y" in situations in which Y≥0 and Y<0 in the first type system, can be rewritten by rewriter program 126 in several varying steps.

In one embodiment, rewriter program 126 rewrites a request that includes a zoned decimal format relational operator to ensure its accurate evaluation in a second type system that includes only unsigned binary relational operators. Zoned decimal numbers are comprised of bytes which are each split into an upper and lower half of equal length. The upper half is the zone and the lower half is the digit. In the EBCDIC zoned decimal format, all zones aside from the last one contain the value 15 (i.e., 0xF). The last zone holds the sign information about the number, such that a C signifies a positive number, and a D signifies a negative number. For the following discussion, each number is segmented into a leading digits value and a last digit value.

In the following discussion, bracket notation is used (e.g., "[" and "]"). For example, for a number X, to represent a segment of the first 3 bytes of X, the notation "X[1:3]" will be used. If only 1 byte of X is being represented, the notation will be shortened to, e.g., "X[4]" indicating that only the 4th byte is used.

If the request that includes a zoned decimal format relational operator includes a "greater than" comparison in the form "X>Y," then if Y≥0 in the first type system, the request can be rewritten by rewriter program 126 in several steps. Where Y is 124, Y's lastDigit is 0xC4, denoted by Y[3]. Y's leadingDigit is 0xF1F2, denoted by Y[1:2]. Rewriter program 126 generates the following logic:
 "X[3]≥0xC0 AND X[3]≤Y[3] AND X[1:2]>0xF1F2 OR"
 "X[3]>Y[3] AND X[3]≤0xC9 AND X[1:2]≥0xF1F2"

If Y<0, e.g. where y is −124, Y's lastDigit is 0xD4, denoted by Y[3], and Y's leadingDigit is 0xF1F2, denoted by Y[1:2]. Rewriter program 126 generates the following logic:
 "X[3]≥0xC0 AND X[3]≤0xC9 OR"
 "X[3]≥0xD0 AND X[3]<Y[3] AND X[1:2]≤0xF1F2 OR"
 "X[3]≥Y[3] AND X[3]≤0xD9 AND X[1:2]<0xF1F2"

The first set of rules accepts all positive numbers, the second set accepts smaller negative numbers such as −122, and the third set accepts all other negative numbers such as −14.

If the request that includes a zoned decimal format relational operator includes a "greater than or equal to" comparison in the form "X≥Y," then if Y≥0 in the first type system, the request can be rewritten by rewriter program 126 in several steps. Where y is 124, Y's lastDigit is 0xC4, denoted by Y[3] and Y's leadingDigit is 0xF1F2, denoted by Y[1:2]. Rewriter program 126 generates the following logic:
 "X[3]≥0xC0 AND X[3]<Y[3] AND X[1:2]>0xF1F2 OR"
 "X[3]≥Y[3] AND X[3]≤0xC9 AND X[1:2]≥0xF1F2"

If Y<0, e.g., where y is −124, Y's lastDigit is 0xD4, denoted by Y[3], and Y's leadingDigit is 0xF1F2, denoted by Y[1:2]. Rewriter program 126 generates the following logic:
 "X[3]≥0xC0 AND X[3]≤0xC9 OR"
 "X[3]≥0xD0 AND X[3]≤Y[3] AND X[1:2]≤0xF1F2 OR"
 "X[3]≥Y[3] AND X[3]≤0xD9 AND X[1:2]<0xF1F2"

The first set of rules accepts all positive numbers, the second set accepts smaller negative numbers such as −122, and the third set accepts all other negative numbers such as −14. In one embodiment the rules are joined disjunctively before being returned from rewriter program 126.

If the request that includes a zoned decimal format relational operator includes a "less than" comparison in the form "X<Y," then if Y≥0 in the first type system, the request can be rewritten by rewriter program 126 in several steps. Where Y is 124, Y's lastDigit is 0xC4, denoted by Y[3] and Y's leadingDigit is 0xF1F2, denoted by Y[1:2]. Rewriter program 126 generates the following logic:
 "X[3]≥0xD0 AND X[3]≤0xD9 OR"
 "X[3]≥0xC0 AND X[3]<Y[3] AND X[1:2]≤0xF1F2 OR"
 "X[3]≥Y[3] AND X[3]≤0xC9 AND X[1:2]<0xF1F2"

The first rule accepts all negative numbers, the second accepts negative numbers such as 122, and the last rule accepts negative numbers such as 15.

If Y<0, e.g., where y is −124, Y's lastDigit is 0xD4, denoted by Y[3], and Y's leadingDigit is 0xF1F2, denoted by Y[1:2]. Rewriter program 126 generates the following logic:

"X[3]≥0xD0 AND X[3]≤Y[3] AND X[1:2]>0xF1F2 OR"
"X[3]>Y[3] AND X[3]≤0xD9 AND X[1:2]≥0xF1F2"

The first rule accepts numbers such as −133, and the second rule accepts numbers such as −125, −135.

If the request that includes a zoned decimal format relational operator includes a "less than or equal to" comparison in the form "X≤Y," then if Y≥0 in the first type system, the request can be rewritten by rewriter program 126 in several steps. Where Y is 124, Y's lastDigit is 0xC4, denoted by Y[3] and Y's leadingDigit is 0xF1F2, denoted by Y[1:2]. Rewriter program 126 generates the following logic:

"X[3]≥0xD0 AND X[3]≤0xD9 OR"
"X[3]≥0xC0 AND X[3]≤Y[3] AND X[1:2]≤0xF1F2 OR"
"X[3]>Y[3] AND X[3]≤0xC9 AND X[1:2]<0xF1F2"

The first rule accepts all negative numbers, the second accepts negative numbers such as 122, 124, and the last rule accepts negative numbers such as 15. If Y<0, e.g., where Y is −124, Y's lastDigit is 0xD4, denoted by Y[3], and Y's leadingDigit is 0xF1F2, denoted by Y[1:2]. Rewriter program 126 generates the following logic:

"X[3]≥0xD0 AND X[3]<Y[3] AND X[1:2]>0xF1F2 OR"
"X[3]≥Y[3] AND X[3]≤0xD9 AND X[1:2]≥0xF1F2"

The first rule accepts numbers such as −133, and the second rule accepts numbers such as −124, −125, −135.

As discussed above rewriter program 126 rewrites requests originating on client system 120 to ensure their accurate evaluation on server system 130. For example, rewriter program 126 can rewrite a variety of requests that include relational operators to ensure their accurate evaluation in a second type system that includes only unsigned binary relational operators. The variety of requests can include a signed two's complement byte-length relational operator, a floating-point type relational operator, packed decimal format relational operators, or zoned decimal format relational operators, for example.

Figure 2:
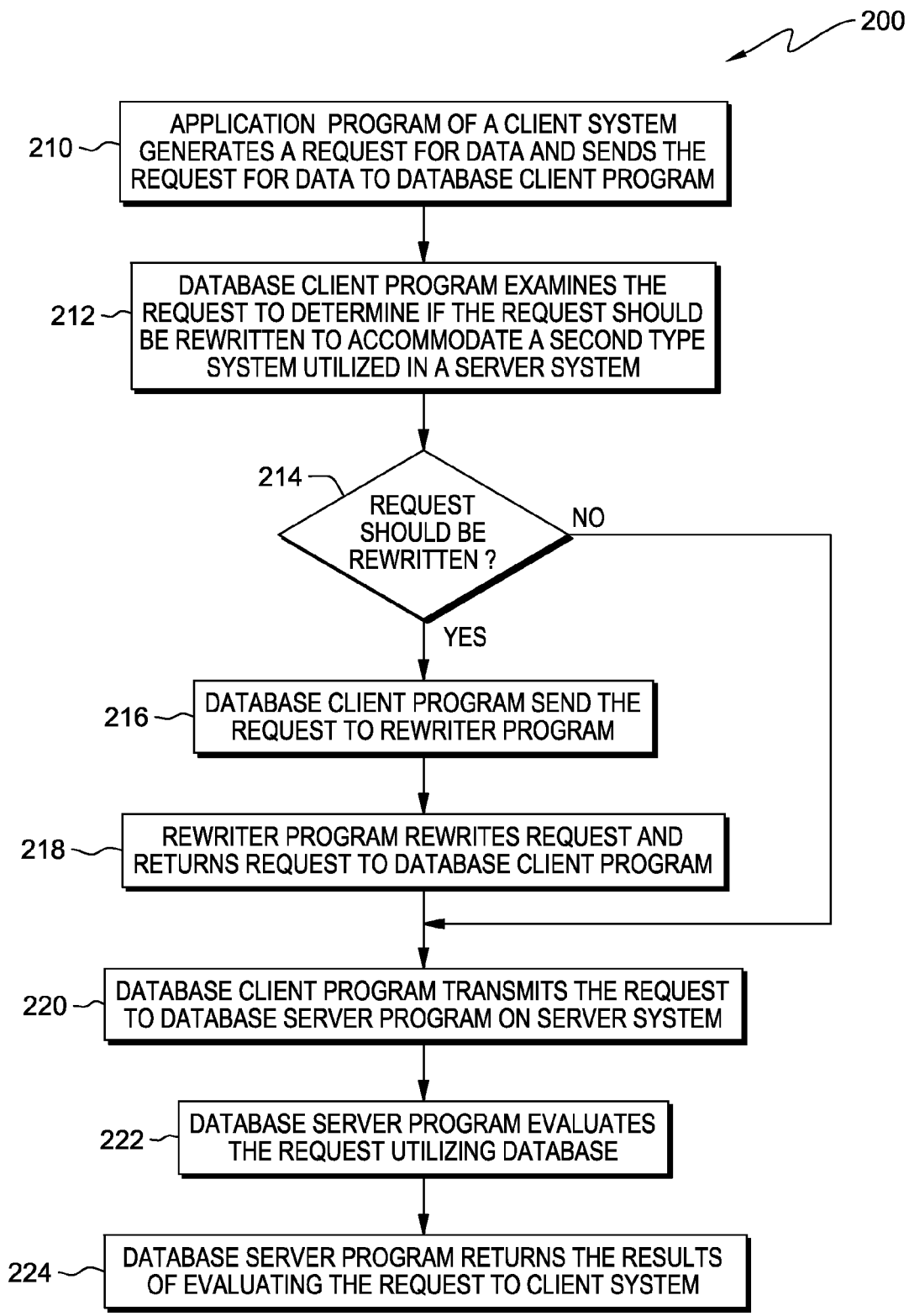
FIG. 2 is a flowchart depicting steps followed by programs of a client system and a server system during the rewriting of requests to accommodate varying type systems in accordance with an embodiment of the present invention.

FIG. 2 shows flowchart 200 depicting steps followed by programs of client system 120 and server system 130 during the rewriting of requests to accommodate varying type systems in accordance with an embodiment of the present invention. In step 210, application program 122 of client system 120 generates a request for data and sends the request for data to database client program 124. In step 212, database client program 124 examines the request to determine if the request should be rewritten to accommodate a second type system utilized in server system 130. If database client program 124 determines in step 214 that the request should be rewritten, then in step 216 database client program 124 sends the request to rewriter program 126. In step 218, rewriter program 126 rewrites the request and returns the request to database client program 124, and in step 220 database client program 124 transmits the request to database server program 134 on server system 130. However, if database client program 124 determines that the request should not be rewritten in step 214, then in step 220 database client program 124 transmits the request to database server program 134 without utilizing rewriter program 126. In step 222, database server program 134 evaluates the request utilizing database 136, and in step 224 database server program 134 returns the results of evaluating the request to client system 120, where the request is provided to application program 122.

Figure 3:
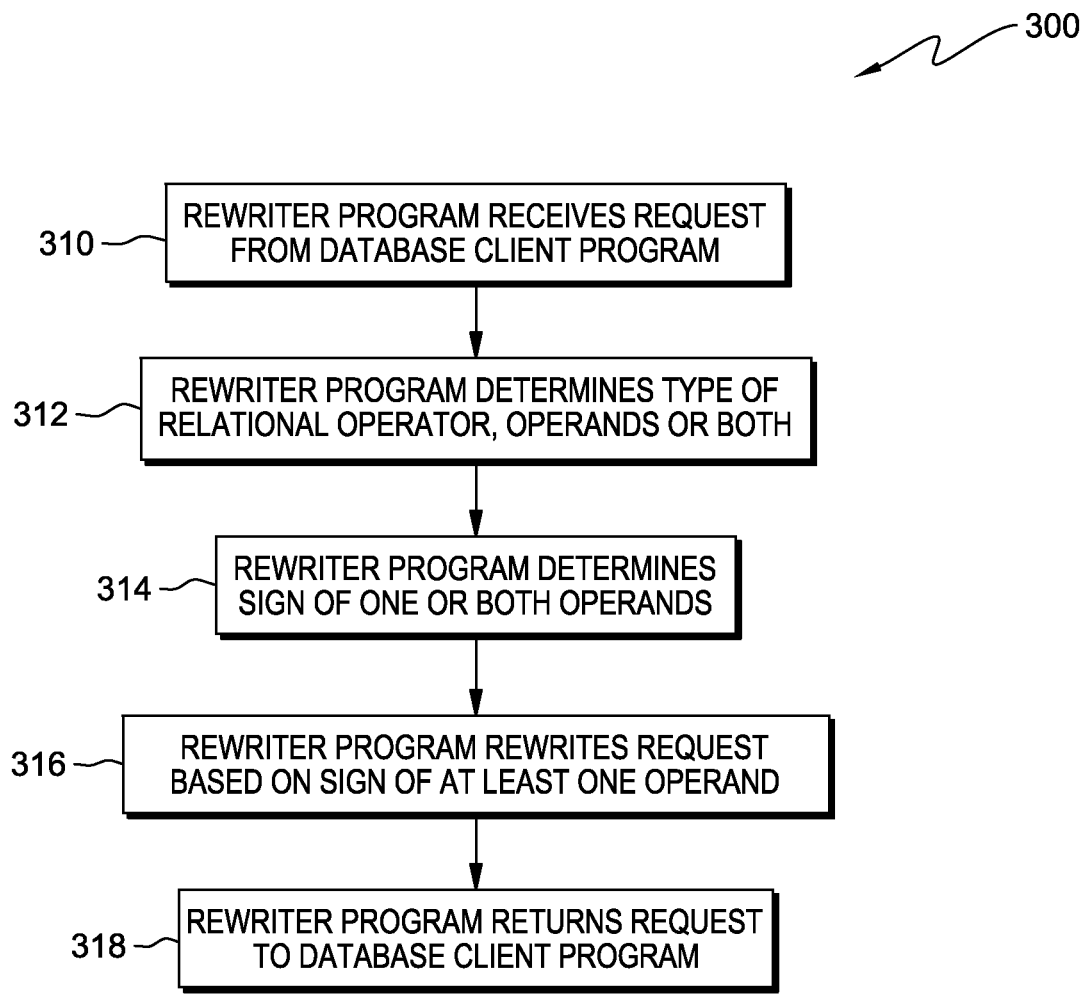
FIG. 3 is a flowchart depicting steps followed by a rewriter program during the rewriting of a request to accommodate varying type systems in accordance with an embodiment of the present invention.

FIG. 3 shows flowchart 300 depicting steps followed by rewriter program 126 during the rewriting of a request to accommodate varying type systems in accordance with an embodiment of the present invention. In step 310, rewriter program 126 receives a request from database client program 124. In step 312, rewriter program determines the type of relational operator, operands, or both, included in the request. The types of the relational operator, operands, or both, can include signed two's complement byte-length relational operator, a floating-point type relational operator, or a packed or zoned decimal format relational operators, for example. In step 314, rewriter program 126 determines the sign of one or both operands. Determining the sign of an operand can include determining whether it is a positive number, a negative number, or zero, in a first type system of client system 120, for example. In step 316, rewriter program 126 rewrites the request based on the sign of at least one of the operands. Rewriting the request can include generating a group of conjunctive terms joined disjunctively as discussed above, for example. In step 318, rewriter program 126 returns the request to database client program 124.

Figure 4:
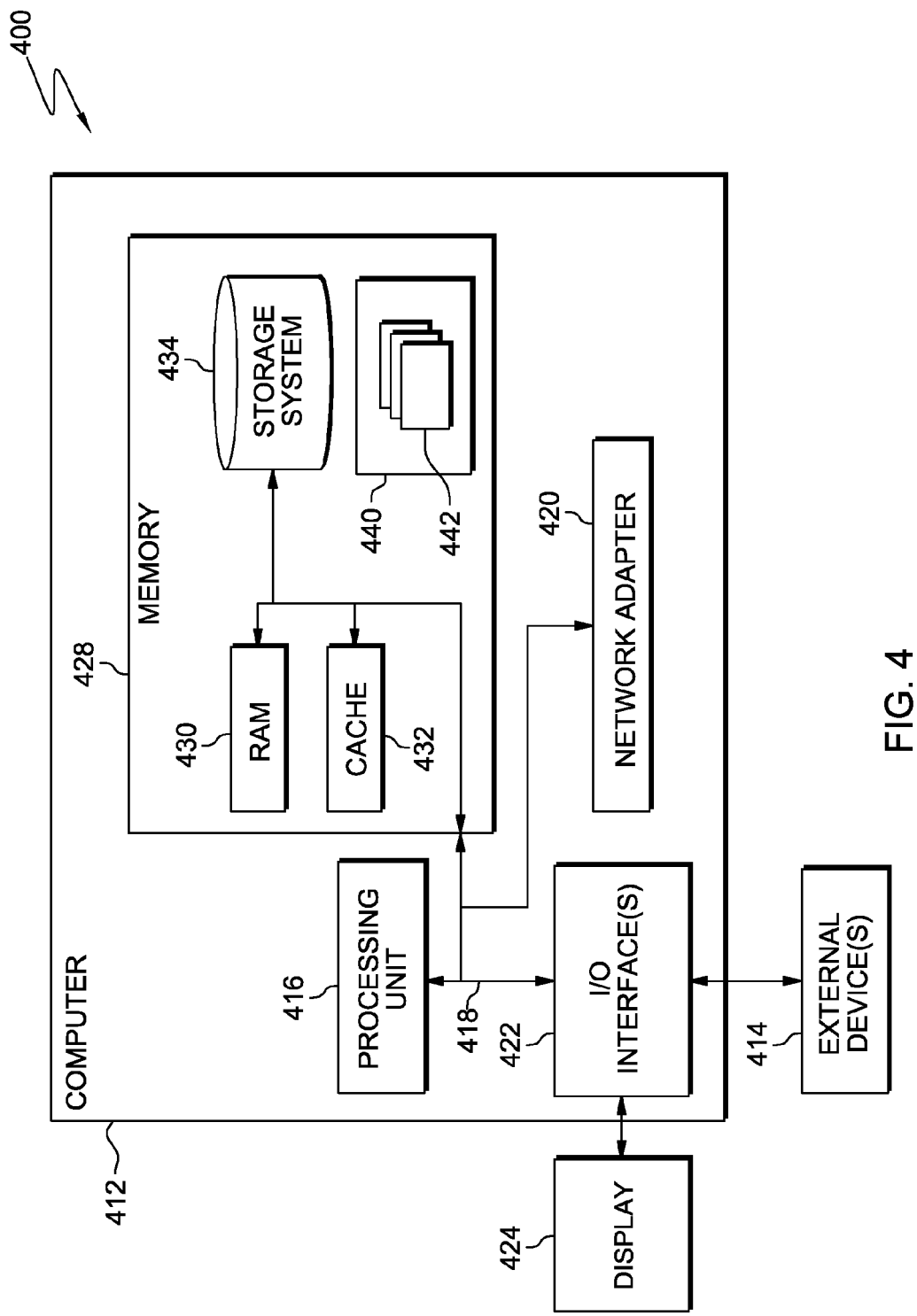
FIG. 4 is a functional block diagram of a computer system in accordance with an embodiment of the present invention.

Referring now to FIG. 4, a functional block diagram of a computer system in accordance with an embodiment of the present invention is shown. Computer system 400 is only one example of a suitable computer system and is not intended to suggest any limitation as to the scope of use or functionality of embodiments of the invention described herein. Regardless, computer system 400 is capable of being implemented and/or performing any of the functionality set forth hereinabove.

In computer system 400 there is computer 412, which is operational with numerous other general purpose or special purpose computing system environments or configurations. Examples of well-known computing systems, environments, and/or configurations that may be suitable for use with computer 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Each one of client system 120 and server system 130 can include or can be implemented as an instance of computer 412.

Computer 412 may be described in the general context of computer system executable instructions, such as program modules, being executed by a computer system. Generally, program modules may include routines, programs, objects, components, logic, data structures, and so on that perform particular tasks or implement particular abstract data types. Computer 412 may be practiced in distributed cloud computing environments where tasks are performed by remote processing devices that are linked through a communications network. In a distributed cloud computing environment, program modules may be located in both local and remote computer system storage media including memory storage devices.

As further shown in FIG. 4, computer 412 in computer system 400 is shown in the form of a general-purpose computing device. The components of computer 412 may include, but are not limited to, one or more processors or processing units 416, memory 428, and bus 418 that couples various system components including memory 428 to processing unit 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 412 typically includes a variety of computer system readable media. Such media may be any available media that is accessible by computer 412, and includes both volatile and non-volatile media, and removable and non-removable media.

Memory 428 can include computer system readable media in the form of volatile memory, such as random access memory (RAM) 430 and/or cache 432. Computer 412 may further include other removable/non-removable, volatile/non-volatile computer system storage media. By way of example only, storage system 434 can be provided for reading from and writing to a non-removable, non-volatile magnetic media (not shown and typically called a "hard drive"). Database 136 can be stored on storage system 434 in one embodiment. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program 440, having one or more program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein. Each one of application program 122, database client program 124, rewriter program 126, and database server program 134 can be implemented as or can be an instance of program 440.

Computer 412 may also communicate with one or more external devices 414 such as a keyboard, a pointing device, etc., as well as display 424; one or more devices that enable a user to interact with computer 412; and/or any devices (e.g., network card, modem, etc.) that enable computer 412 to communicate with one or more other computing devices. Such communication can occur via Input/Output (I/O) interfaces 422. Still yet, computer 412 can communicate with one or more networks such as a local area network (LAN), a general wide area network (WAN), and/or a public network (e.g., the Internet) via network adapter 420. As depicted, network adapter 420 communicates with the other components of computer 412 via bus 418. It should be understood that although not shown, other hardware and/or software components could be used in conjunction with computer 412. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardwarebased systems that perform the specified functions or acts, or combinations of special purpose hardware and computer instructions.

What is claimed is:

1. A computer-implemented method for rewriting a relational expression, the method comprising:
   determining, by one or more processors, a first type of relational expression, wherein the first type of relational expression includes: a signed two's complement byte-length, a floating-point type, a packed decimal format, and a zoned decimal format;
   determining, by one or more processors, a first segment of bytes and a second segment of bytes, wherein the first segment of bytes comprises leading bytes and the second segment of bytes comprises a last byte containing sign information;
   generating, by one or more processors, a first set of conjunctive terms, wherein the first set of conjunctive terms are compared to the first segment of bytes and the second segment of bytes; and
   rewriting, by the processor, the first type of the relational expression to a second type of relational expression based, at least in part, on the first set of conjunctive terms.

2. The method of claim 1, wherein the step of determining a first segment of bytes and a second segment of bytes further comprises determining, by one or more processors, whether a second operand value is zero, greater than zero, or less than zero.

3. The method of claim 2, wherein the step of determining whether a second operand value is zero, greater than zero, or less than zero further comprises responsive to determining the second operand value is zero or greater than zero, generating, by one or more processors, a first set of conjunctive terms, wherein the first set of conjunctive terms test for equality of a first operand value.

4. The method of claim 2, wherein the step of determining whether a second operand value is zero, greater than zero, or less than zero further comprises responsive to determining the second operand value is less than zero, generating, by one or more processors, a second set of conjunctive terms, wherein the second set of conjunctive terms test for equality of a first operand value and the second operand value.

5. The method of claim 1, wherein generating a first set of conjunctive terms further comprises modifying, by one or more processors, a comparison operator for each of the first set of conjunctive terms greater than a value stored in the last byte containing the sign information and joining, by one or more processors, the first set of conjunctive terms disjunctively.

6. The method of claim 1, wherein the second type of relational expression comprises an unsigned binary relational operator.

\* \* \* \* \*